United States Patent
Kariya

(10) Patent No.: US 9,359,242 B2
(45) Date of Patent: *Jun. 7, 2016

(54) GLASS-PLATE MANUFACTURING METHOD

(71) Applicant: AvanStrate Inc., Yokkaichi-shi, Mie (JP)

(72) Inventor: Hiroyuki Kariya, Yokkaichi (JP)

(73) Assignee: AvanStrate Inc., Mie (JP)

(*) Notice: Subject to any disclaimer, the term of this patent is extended or adjusted under 35 U.S.C. 154(b) by 116 days.

This patent is subject to a terminal disclaimer.

(21) Appl. No.: 13/720,151

(22) Filed: Dec. 19, 2012

(65) Prior Publication Data

US 2013/0180285 A1    Jul. 18, 2013

Related U.S. Application Data

(63) Continuation of application No. PCT/JP2012/058716, filed on Mar. 30, 2012.

(30) Foreign Application Priority Data

Mar. 31, 2011 (JP) .................................. 2011-081260
Mar. 31, 2011 (JP) .................................. 2011-081261
Mar. 31, 2011 (JP) .................................. 2011-081262

(51) Int. Cl.
  *C03B 17/06* (2006.01)

(52) U.S. Cl.
  CPC ............. *C03B 17/067* (2013.01); *C03B 17/064* (2013.01)

(58) Field of Classification Search
  None
  See application file for complete search history.

(56) References Cited

U.S. PATENT DOCUMENTS

| 3,682,609 | A  | * | 8/1972  | Dockerty ........................ 65/83 |
| 6,758,064 | B1 | * | 7/2004  | Kariya .............................. 65/91 |
| 2004/0055335 | A1 |   | 3/2004  | Lee |
| 2009/0100873 | A1 | * | 4/2009  | Allan et al. ....................... 65/85 |
| 2009/0226733 | A1 |   | 9/2009  | Kato et al. |
| 2010/0218557 | A1 |   | 9/2010  | Aniolek et al. |

FOREIGN PATENT DOCUMENTS

| CN | 101312918 A | 11/2008 |
| CN | 101717633 A | 6/2010 |

(Continued)

OTHER PUBLICATIONS

JP05-124827 Machine Translation Performed JPO website Aug. 21, 2014.*

(Continued)

*Primary Examiner* — Lisa Herring
(74) *Attorney, Agent, or Firm* — Sughrue Mion, PLLC

(57) ABSTRACT

A glass-plate manufacturing method employing a down-draw process includes: a forming step of forming a sheet glass by making a molten glass flow downward along opposite side surfaces of a forming member and merge at a lower section of the forming member; and a cooling step of cooling the sheet glass while drawing the sheet glass downward with rollers. In the cooling step, an above-glass-strain-point temperature control step is performed which is a step of performing a temperature control in the width direction of the sheet glass in a temperature region ranging from the lower section of the forming member to where the temperature of the sheet glass falls below a temperature region near the glass strain point, and includes: first, second and third temperature control steps as defined herein.

11 Claims, 8 Drawing Sheets

(56) References Cited

FOREIGN PATENT DOCUMENTS

| | | | |
|---|---|---|---|
| CN | 101817633 A | 9/2010 | |
| CN | 101925546 A | 12/2010 | |
| JP | 05124827 A | * | 5/1993 |
| JP | 10-291826 A | 11/1998 | |
| JP | 2001-031435 A | 2/2001 | |
| JP | 2004-115357 A | 4/2004 | |
| JP | 2007-112665 A | 5/2007 | |
| JP | 2009-502706 A | 1/2009 | |
| JP | 2010-504273 A | 2/2010 | |
| JP | 2011-20864 A | 2/2011 | |
| TW | 201041813 A1 | 12/2010 | |
| WO | 2007/014066 A2 | 2/2007 | |
| WO | 2007/037871 A1 | 4/2007 | |
| WO | 2008/036227 A1 | 3/2008 | |

OTHER PUBLICATIONS

JP05-124827 English Translation Performed by FLS. Inc., Oct. 2013.*

English Translation of the International Preliminary Report on Patentability and Written Opinion of the International Searching Authority mailed Oct. 17, 2013 for corresponding International Application No. PCT/JP2012/058716.

* cited by examiner

| Temperature profiles at the lower section of forming member | L | CL | C | CR | R |
|---|---|---|---|---|---|
| TP11 | 1150 | 1150 | 1150 | 1150 | 1150 |
| TP21 | 880 | 1070 | 1070 | 1070 | 880 |
| TP22 | 785 | 798 | 819 | 792 | 776 |
| TP31 | 763 | 770 | 784 | 765 | 757 |
| TP41 | 647 | 647 | 670 | 654 | 653 |
| TP42 | 585 | 565 | 562 | 570 | 582 |
| TP42 | 506 | 472 | 463 | 468 | 488 |

FIG. 6

| | ST10 | | | ST14 |
|---|---|---|---|---|
| | | ST10a | | |
| | ST11 | ST12 | ST13 | |
| Cooling rates (°C/second) | R L | 2.1 | | 2.0 |
| | CR CL | 2.5 | | 2.7 |
| | C | 2.7 | | 3.0 |
| Temperature gradients (°C/mm) | | TG 21 7.4 ×10⁻³ | | TG 41 4.1 ×10⁻³ |
| | | TG 22 4.7 ×10⁻³ | | TG 42 6.7 ×10⁻³ |

FIG. 8

GLASS-PLATE MANUFACTURING METHOD

CROSS REFERENCE TO RELATED APPLICATIONS

This application is a continuation of International Application No. PCT/JP2012/058716 filed Mar. 30, 2012, which claims priority from Japanese Patent Application No. 2011-081260 filed Mar. 31, 2011, Japanese Patent Application No. 2011-081261 filed Mar. 31, 2011 and Japanese Patent Application No. 2011-081262 filed Mar. 31, 2011.

TECHNICAL FIELD

The present invention relates to a glass-plate manufacturing method.

BACKGROUND ART

There are methods for manufacturing glass plates by employing down-draw process, as disclosed in Patent Literature 1 (Japanese Patent Application Laid-Open Publication JP-A-2004-115357). In down-draw process, molten glass is first poured into a forming member, and then the molten glass is made to overflow from the top sections of the forming member. The molten glass that has overflowed then flows downward along the opposite side surfaces of the forming member, and the streams of molten glass merge at the lower end of the forming member, thus being made into a sheet-form glass (sheet glass). The sheet glass is then drawn downward by rollers and cut into predetermined lengths.

SUMMARY OF THE INVENTION

Technical Problem

In the invention disclosed in Patent Literature 1, residual stresses in the sheet glass are reduced by setting, to a predetermined value, the temperature gradient between the widthwise central section of the sheet glass and the vicinity of the end section thereof within a predetermined temperature region. Also, in the invention disclosed in Patent Literature 1, the temperature gradient between the central section of the sheet glass and the vicinity of the end section thereof is defined with consideration given to residual stresses and strain in the sheet glass.

However, it has not been possible to reduce the warpage and strain of the sheet glass while making the thickness of the sheet glass uniform.

Thus, an objective of the present invention is to provide a glass-plate manufacturing method with which it is possible to make the thickness of a sheet glass as uniform as possible and also reduce warpage and strain (residual stresses).

Solution to Problem

A glass-plate manufacturing method according to an aspect of the present invention is a method for manufacturing a glass plate by a down-draw process, the method including a forming step and a cooling step. In the forming step, a sheet glass is formed by making a molten glass flow downward along opposite side surfaces of a forming member and merge at a lower section of the forming member. In the cooling step, the sheet glass is cooled while drawing the sheet glass downward with rollers. Further, in the cooling step, an above-glass-strain-point temperature control step is performed. The above-glass-strain-point temperature control step is a step of performing a temperature control in the width direction of the sheet glass in a temperature region ranging from the lower section of the forming member to where the temperature of the sheet glass falls below a temperature region near the strain point of glass, and includes a first temperature control step, a second temperature control step, and a third temperature control step. In the first temperature control step, end sections in the width direction of the sheet glass each have a lower temperature than a central region that is sandwiched between the end sections, and the temperature of the central region is kept uniform. In the second temperature control step, the temperature in the width direction of the sheet glass is decreased from a central section of the sheet glass toward the end sections thereof. In the third temperature control step, a temperature gradient between each end section and the central section in the width direction of the sheet glass is minimized in the aforementioned temperature region near the glass strain point. Thus, the thickness of the sheet glass can be made as uniform as possible, and warpage and strain (residual stresses) can also be reduced. Note here that the central region of the sheet glass is a region including sections subjected to thickness equalization, and the end sections of the sheet glass are regions including sections subjected to cutting after manufacture.

In the first temperature control step, by making the temperature of the end sections in the width direction of the sheet glass lower than the temperature of the central region sandwiched between the end sections, the viscosity of the end sections of the sheet glass is increased. Thus, contraction in the width direction of the sheet glass is inhibited. If the sheet glass contracts in the width direction, the contracted sections become thick, and thickness deviation becomes poor. So, by making the temperature of the widthwise (lateral) end sections of the sheet glass lower than the temperature of the central region, the plate thickness can be made uniform. Moreover, in the first temperature control step, by keeping the temperature of the central region of the sheet glass uniform, the viscosity of the central region becomes uniform. Thus, the thickness of the sheet glass can be made uniform.

In the second temperature control step, a temperature gradient is formed in a manner such that the temperature in the width direction of the sheet glass decreases from the central section toward the end sections. In the third temperature control step, the sheet glass is cooled in a manner such that the temperature gradient formed in the second temperature control step is reduced toward the aforementioned temperature region near the glass strain point. In this way, the amount of volumetric shrinkage of the sheet glass increases from the end sections of the sheet glass toward the central section, and thus, a tensile stress acts on the central section of the sheet glass. Particularly, a tensile stress acts on the central section of the sheet glass in both the flow direction and the width direction of the sheet glass. It should be noted that, preferably, the tensile stress acting in the flow direction of the sheet glass is larger than the tensile stress acting in the width direction of the sheet glass. With this tensile stress, the sheet glass can be cooled while maintaining the flatness of the sheet glass, and thus, warpage of the sheet glass can be reduced.

Meanwhile, if the sheet glass has a temperature gradient at the glass strain point, then a strain will occur when the sheet glass is cooled to room temperature. So, in the third temperature control step, the sheet glass is cooled in a manner such that the temperature gradient is reduced toward the aforementioned temperature region near the glass strain point. Thus, strains after cooling can be reduced. It should be noted that, as regards the sheet glass cooled in the third temperature control step, it is preferable that the value found by subtracting the temperature of the end section from the temperature of the widthwise central section falls within a range of from −20° C. to 20° C.

Further, it is more preferable that, in the second temperature control step, the widthwise temperature gradient of the sheet glass gradually decreases along the flow direction of the sheet glass.

Moreover, it is more preferable that, in the second temperature control step, the temperature gradient is formed in a manner such that the temperature in the width direction of the sheet glass gradually decreases from the central section toward the end sections.

Furthermore, it is more preferable that, in the second temperature control step, the temperature gradient is formed in a manner such that the temperature in the width direction of the sheet glass gradually decreases from the central section toward the end sections, and that this temperature gradient gradually decreases along the flow direction of the sheet glass.

Moreover, it is more preferable that, in the second temperature control step, the temperature gradient is formed in a manner such that the temperature in the width direction of the sheet glass gradually decreases according to a convex profile from the central section toward the end sections.

Furthermore, it is more preferable that, in the second temperature control step, the temperature gradient is formed in a manner such that the temperature in the width direction of the sheet glass gradually decreases according to a convex profile from the central section toward the end sections, and that this temperature gradient gradually decreases along the flow direction of the sheet glass.

Moreover, it is preferable that the first temperature control step is performed when the temperature of the central section of the sheet glass is higher than or equal to the softening point of glass, and the second temperature control step and the third temperature control step are performed when the temperature of the central section of the sheet glass is below the glass softening point. In this way, the temperature in the central region of the sheet glass is controlled so that it becomes uniform and the thickness of the sheet glass is made uniform in the first temperature control step, and after that, the second temperature control step and the third temperature control step are performed. Accordingly, it is possible to apply a tensile stress in the flow direction and the width direction of the sheet glass to the central section of the sheet glass whose thickness has been made uniform. Thus, the sheet glass can be cooled while maintaining the flatness of the sheet glass, and thus warpage of the sheet glass can be reduced.

Moreover, it is preferable that the difference in temperature between each end section and the central section in the width direction of the sheet glass during the cooling step is made the smallest in the third temperature control step. If the sheet glass has a difference in temperature at the glass strain point, then a strain will occur after the sheet glass is cooled to room temperature. So, by minimizing the difference in temperature between each end section and the central section in the width direction of the sheet glass within the aforementioned temperature region near the glass strain point, strains in the sheet glass can be reduced.

Moreover, preferably, "minimizing the temperature gradient" means that a value found by subtracting the temperature of the end section from the temperature of the central section in the width direction of the sheet glass falls within a range of from −20° C. to 20° C.

Furthermore, it is preferable that, in the cooling step, a fourth temperature control step is further performed, the fourth temperature control step in which, in a temperature region below the aforementioned temperature region near the glass strain point, the temperature in the width direction of the sheet glass is decreased from the end sections toward the central section. In this way, the cooling amount of the sheet glass increases from the end sections toward the central section of the sheet glass. Accordingly, a tensile stress is applied to the central section of the sheet glass in the flow direction and the width direction of the sheet glass, as described above. Thus, the sheet glass can be cooled while maintaining the flatness of the sheet glass, and thus warpage of the sheet glass can be reduced.

Moreover, it is preferable that, in the fourth temperature control step, a temperature gradient is formed in a manner such that the temperature of the sheet glass gradually decreases from the widthwise (lateral) end sections toward the central section in the temperature region below the aforementioned temperature region near the glass strain point.

Furthermore, it is preferable that, in the fourth temperature control step, a temperature gradient is formed in a manner such that the temperature of the sheet glass gradually decreases according to a convex profile from the widthwise (lateral) end sections toward the central section in the temperature region below the aforementioned temperature region near the glass strain point.

Moreover, it is preferable that, in the fourth temperature control step, the temperature gradient between each end section and the central section in the width direction of the sheet glass is increased along the flow direction of the sheet glass.

Further, it is preferable that, in the fourth temperature control step, the temperature gradient between each end section and the central section in the width direction of the sheet glass is gradually increased along the flow direction of the sheet glass.

Further, it is preferable that the sheet glass has a strain value of 1.0 nm or less, and more preferably, a strain value ranging from 0 nm to 0.95 nm, and even more preferably, ranging from 0 nm to 0.90 nm.

Furthermore, it is preferable that the sheet glass has a warpage value of 0.15 mm or less, and more preferably, a warpage value ranging from 0 mm to 0.10 mm, and even more preferably, ranging from 0 mm to 0.05 mm.

Moreover, it is preferable that the sheet glass has a thickness deviation of 15 μm or less, and more preferably, a thickness deviation ranging from 0 μm to 14 μm, and even more preferably, ranging from 0 μm to 13 μm.

Advantageous Effects of Invention

With the glass-plate manufacturing method according to the present invention, the thickness of a sheet glass can be made as uniform as possible, and warpage and strain (residual stresses) can also be reduced.

BRIEF DESCRIPTION OF DRAWINGS

FIG. 6 is a table showing the temperatures of a sheet glass SG in various temperature profiles (described later).

FIG. 8 is a table showing cooling rates and temperature gradients in various temperature control steps.

DESCRIPTION OF EMBODIMENTS

A glass-plate manufacturing method for manufacturing glass plates by using a glass-plate manufacturing device 100 of the present embodiment will be described below with reference to the drawings.

(1) Overview of Glass-Plate Manufacturing Method

Figure 1:
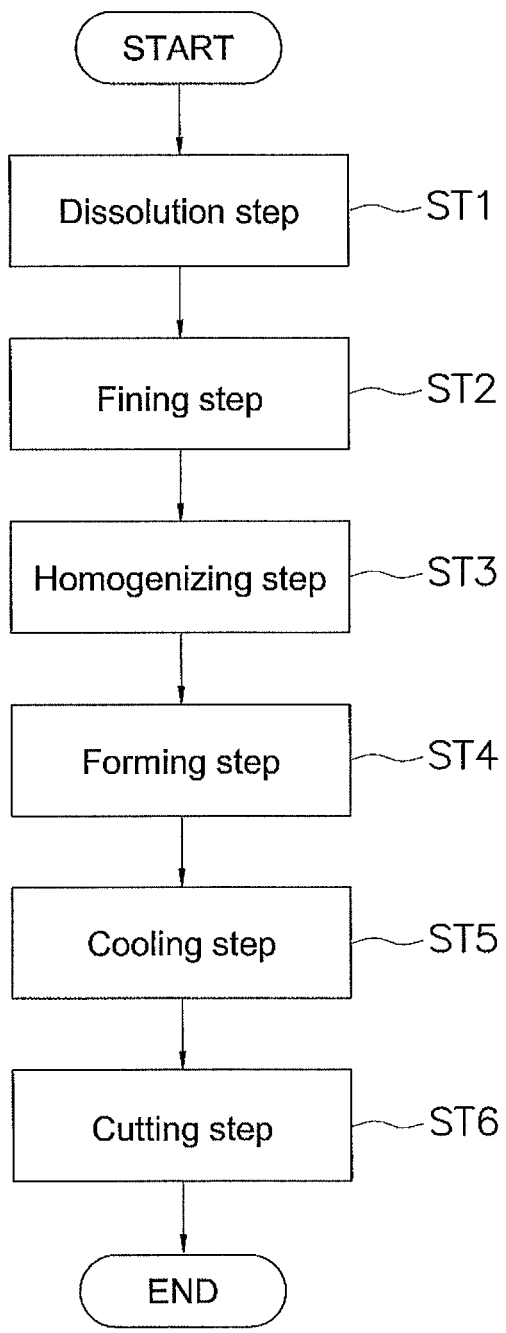
FIG. 1 is a flowchart of a portion of a glass-plate manufacturing method according to an embodiment.

FIG. 1 is a flowchart of a portion of a glass-plate manufacturing method according to the present embodiment.

Hereinbelow, the glass-plate manufacturing method will be described with reference to FIG. 1.

As illustrated in FIG. 1, a glass plate is manufactured through various steps, including a dissolution step ST1, a fining step ST2, a homogenizing step ST3, a forming step ST4, a cooling step ST5, and a cutting step ST6. These steps will be described below.

In the dissolution step ST1, a glass raw material is heated and dissolved. The glass raw material is composed of $SiO_2$, $Al_2O_3$, and the like. The completely dissolved glass raw material becomes a molten glass.

In the fining step ST2, the molten glass is subjected to fining. More specifically, gaseous components contained in the molten glass are expelled from the molten glass, or, the gaseous components contained in the molten glass are absorbed by the molten glass.

In the homogenizing step ST3, the molten glass is homogenized. It should be noted that in this step, the molten glass that has been subjected to fining undergoes temperature adjustment.

In the forming step ST4, the molten glass is formed into a sheet glass SG in the form of a sheet (see FIGS. 3 and 4) by a down-draw process (more specifically, an overflow down-draw process).

In the cooling step ST5, the sheet glass SG that has been formed in the forming step ST4 is cooled. In this cooling step ST5, the sheet glass SG is cooled to a temperature near room temperature.

Figure 3:
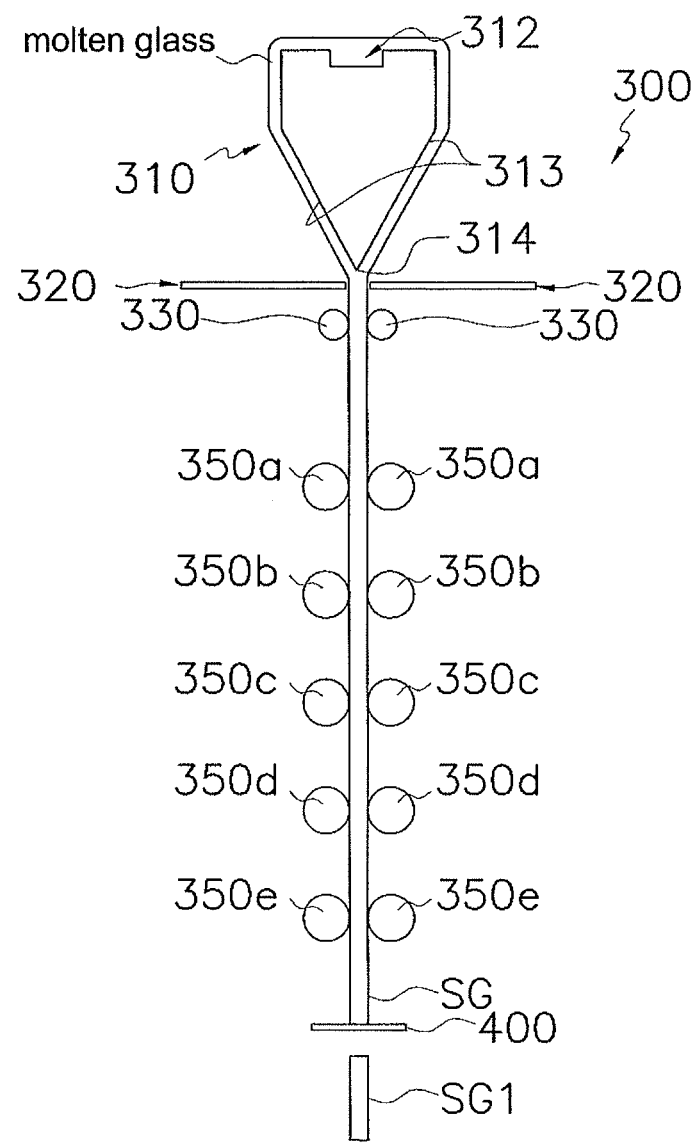
FIG. 3 is a schematic front view of a forming device.

In the cutting step ST6, the sheet glass SG that has been cooled to a temperature near room temperature is cut at predetermined lengths and is formed into pieces of cut sheet glass SG1 (see FIG. 3).

It should be noted that the pieces of cut sheet glass SG1 that have been cut at predetermined lengths are further cut, ground and polished, cleaned, and inspected and thus made into glass plates, which are used for flat panel displays such as liquid crystal displays.

(2) Overview of Glass-Plate Manufacturing Device 100

Figure 2:
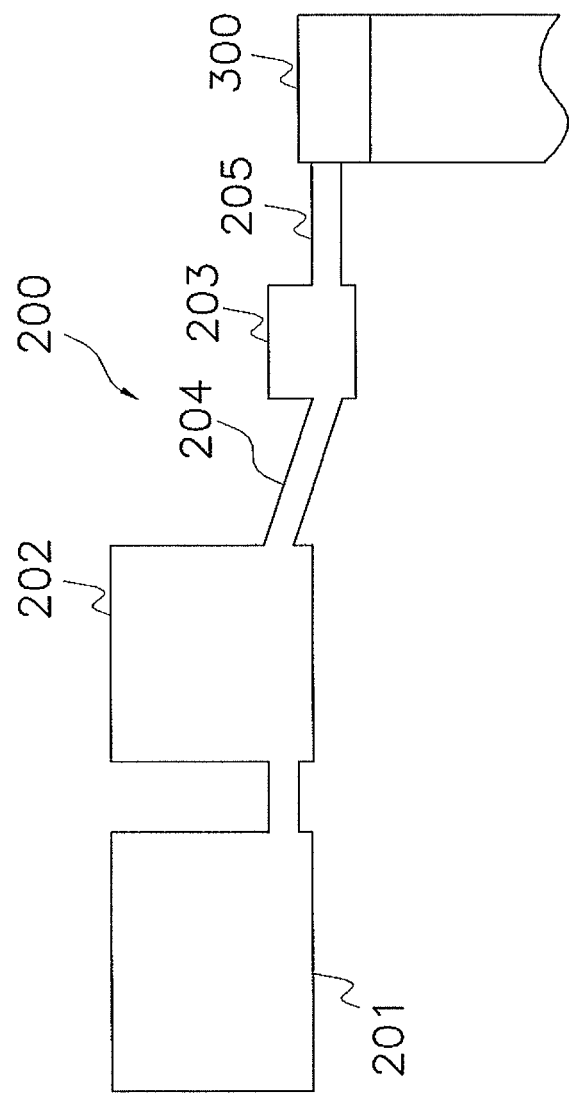
FIG. 2 is a schematic diagram illustrating mainly a dissolution device included in a glass-plate manufacturing device.
Figure 4:
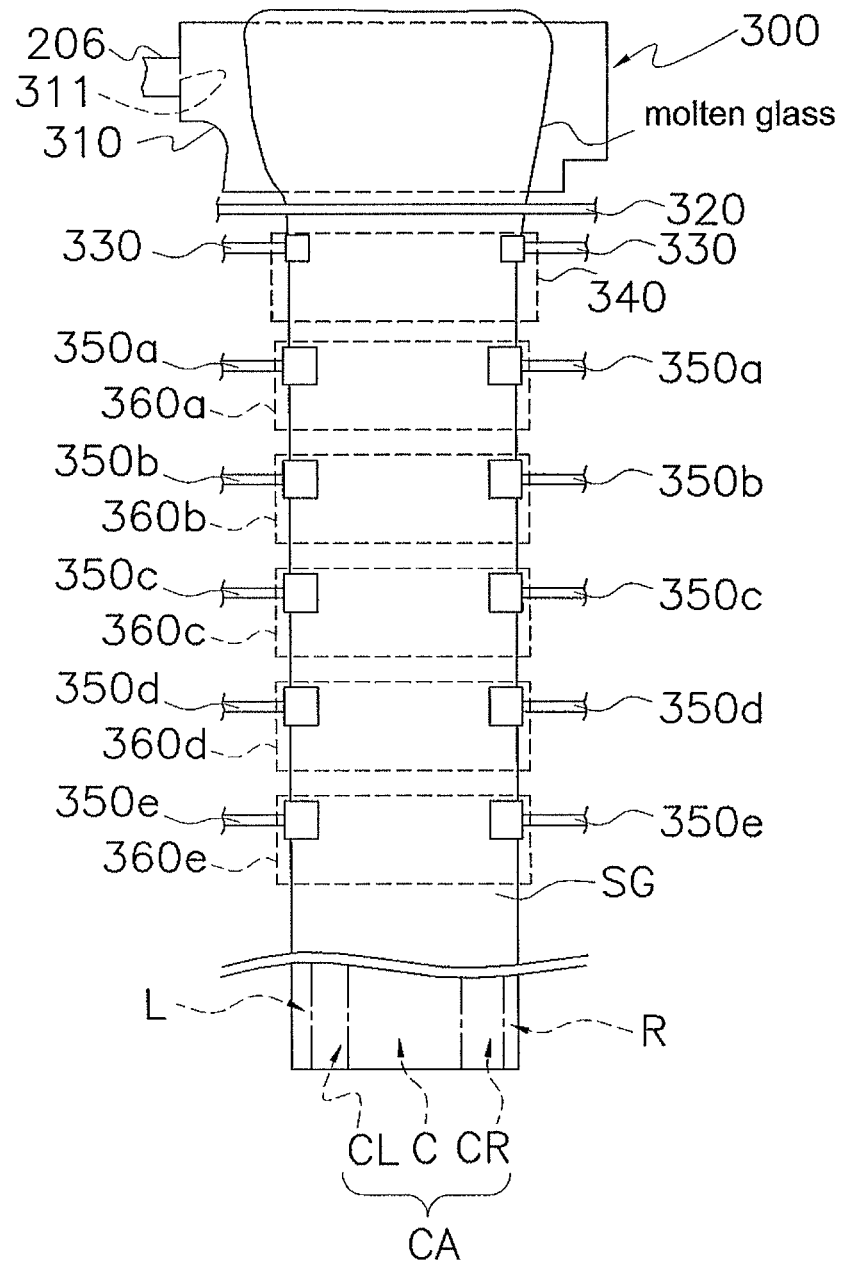
FIG. 4 is a schematic side view of the forming device.

FIG. 2 is a schematic diagram illustrating mainly a dissolution device 200 included in a glass-plate manufacturing device 100. FIG. 3 is a schematic front view of a forming device 300 included in the glass-plate manufacturing device 100. FIG. 4 is a schematic side view of the forming device 300. The glass-plate manufacturing device 100 will be described below.

The glass-plate manufacturing device 100 mainly includes a dissolution device 200 (see FIG. 2), a forming device 300 (see FIGS. 2 to 4), and a cutting device 400 (see FIG. 3).

(2-1) Configuration of Dissolution Device 200

The dissolution device 200 is a device for performing the dissolution step ST1, the fining step ST2, and the homogenizing step ST3.

As illustrated in FIG. 2, the dissolution device 200 includes a dissolution furnace 201, a fining furnace 202, a stirring tank 203, a first pipe 204, and a second pipe 205.

The dissolution furnace 201 is a furnace for dissolving the glass raw material. The dissolution furnace 201 performs the dissolution step ST1.

The fining furnace 202 is a furnace for removing bubbles from the molten glass dissolved in the dissolution furnace 201. By further heating, in the fining furnace 202, the molten glass that has been sent from the dissolution furnace 201, the removal of air bubbles in the molten glass is promoted. The fining furnace 202 performs the fining step ST2.

The stirring tank 203 has a stirring device including a container for containing the molten glass, a rotary shaft, and stirring blades attached to the rotary shaft. The container, the rotary shaft, and the stirring blades made, for example, of a platinum group element, such as platinum, or a platinum-group-element alloy may be used here, although this is not a limitation. The rotary shaft is rotated by driving a drive section (not illustrated) such as a motor, and thus, the stirring blades attached to the rotary shaft stir the molten glass. The stirring tank 203 performs the homogenizing step ST3.

The first pipe 204 and the second pipe 205 are pipes made of a platinum group element or a platinum-group-element alloy. The first pipe 204 is a pipe for connecting the fining furnace 202 and the stirring tank 203. The second pipe 205 is a pipe for connecting the stirring tank 203 and the forming device 300.

(2-2) Configuration of Forming Device 300

The forming device 300 is a device for performing the forming step ST4 and the cooling step ST5.

As illustrated in FIGS. 3 and 4, the forming device 300 includes a forming member 310, atmosphere partitioning components 320, cooling rollers 330, cooling units 340, drawing rollers 350*a* to 350*e*, and heaters 360*a* to 360*e*. The configuration of these components will be described below.

(2-2-1) Forming Member 310

The forming member 310 is a device for performing the forming step ST4.

As illustrated in FIG. 3, the forming member 310 is located in the upper part of the forming device 300, and functions to shape the molten glass, which flows from the dissolution device 200, into a sheet-form glass plate (sheet glass SG) by an overflow down-draw process. The cross-sectional shape of the forming member 310 is wedge shaped when it is cut in the vertical direction, and the forming member 310 is made of brick.

As illustrated in FIG. 4, the forming member 310 has a supply opening 311 formed on the upstream side in the direction of the flow path of the molten glass that flows in from the dissolution device 200. Also, as illustrated in FIG. 3, the forming member 310 has a groove 312 formed along the length direction and opened upward. The groove 312 is formed in a manner such that the depth thereof becomes gradually shallower from the upstream side toward the downstream side in the direction of the flow path of the molten glass.

The molten glass that flows in from the dissolution device 200 toward the forming device 300 flows into the groove 312 of the forming member 310 through the supply opening 311.

The molten glass that has flowed into the groove 312 of the forming member 310 overflows from the top sections of the groove 312 and flows downward along the opposite side surfaces 313 of the forming member 310. The streams of molten glass that flow downward along the side surfaces 313 of the forming member 310 then merge at the lower section 314 of the forming member 310, and the molten glass is formed into a sheet glass SG.

(2-2-2) Atmosphere Partitioning Components 320

As illustrated in FIGS. 3 and 4, the atmosphere partitioning components 320 are plate-shaped components disposed near the lower section 314 of the forming member 310.

The atmosphere partitioning components 320 are disposed in a substantially horizontal manner on both sides in the thickness direction of the sheet glass SG, which flows downward from the lower section 314 of the forming member 310. The atmosphere partitioning components 320 function as a heat insulator. That is, the atmosphere partitioning components 320 partition the air above and below same, and thereby inhibit the movement of heat from above to below the atmosphere partitioning components 320.

(2-2-3) Cooling Rollers 330

The cooling rollers 330 are disposed below the atmosphere partitioning components 320. The cooling rollers 330 are disposed on both sides in the thickness direction of the sheet glass SG and in a manner so as to oppose both widthwise (lateral) end sections of the sheet glass. Each cooling roller 330 is cooled by air with an air-cooling pipe passed through the interior thereof. Thus, at the time of passing between the cooling rollers 330, the widthwise (lateral) end sections on both sides of the thickness direction of the sheet glass SG (these sections are referred to hereinafter as "edges R, L" of the sheet glass SG (see FIGS. 4 and 7)) that come into contact with the air-cooled cooling rollers 330 are cooled. Thus, the viscosity of the edges R, L is brought to a predetermined value (specifically, $10^{9.0}$ poise) or greater. The driving force of a cooling-roller drive motor 390 (see FIG. 5) is transmitted to the cooling rollers 330, and thus, the cooling rollers 330 also serve to draw the sheet glass SG downward.

The sheet glass SG is drawn out to a predetermined thickness by the cooling rollers 330.

(2-2-4) Cooling Units 340

The cooling units 340 are cooling devices of the air-cooling type, and cool the ambient temperatures of the cooling rollers 330 and the sheet glass SG that passes therebelow.

A plurality of cooling units 340 are disposed in the width direction of the sheet glass SG (three in this embodiment) and also in the flow direction thereof. More specifically, one cooling unit 340 is disposed so as to oppose the surface of each edge R, L of the sheet glass SG, and one cooling unit 340 is disposed so as to oppose the surface of a later-mentioned central region CA (see FIGS. 4 and 7).

(2-2-5) Drawing Rollers 350a to 350e

The drawing rollers 350a to 350e are disposed below the cooling rollers 330 at predetermined intervals along the flow direction of the sheet glass SG. The drawing rollers 350a to 350e are disposed on both sides in the thickness direction of the sheet glass SG and in a manner so as to oppose both widthwise (lateral) end sections of the sheet glass SG. The drawing rollers 350a to 350e draw downward the sheet glass SG, in which the viscosity of the edges R, L has been brought to a predetermined value or greater by the cooling rollers 330, while contacting both widthwise (lateral) end sections on both sides of the thickness direction of the aforementioned sheet glass SG. It should be noted that the drawing rollers 350a to 350e are driven by receiving the driving force of a drawing-roller drive motor 391 (see FIG. 5). The peripheral speed of the drawing rollers 350a to 350e is greater than the peripheral speed of the cooling rollers 330. The peripheral speed of the drawing rollers increases toward the downstream side in the flow direction of the sheet glass SG. That is, of the plurality of drawing rollers 350a to 350e, the peripheral speed of the drawing rollers 350a is the slowest, whereas the peripheral speed of the drawing rollers 350e is the fastest.

(2-2-6) Heaters

A plurality of heaters are disposed in the flow direction of the sheet glass SG (five in this embodiment) and also in the width direction of the sheet glass SG (five in this embodiment). The outputs of the heaters 360a to 360e are controlled by a later-mentioned control device 500, and thereby function as a temperature control device for controlling (specifically, raising) the ambient temperatures near the sheet glass SG which is being drawn downward by the drawing rollers 350a to 350e.

The plurality of heaters disposed in the width direction of the sheet glass SG respectively control the ambient temperatures in the edge L, the left section CL (see FIGS. 4 and 7), the central section C (see FIGS. 4 and 7), the right section CR (see FIGS. 4 and 7), and the edge R, listed in order from the upstream side in the aforementioned flow-path direction.

Here, the ambient temperatures of the sheet glass SG, which is being drawn downward by the drawing rollers 350a to 350e, are controlled by the heaters 360a to 360e (more specifically, the temperatures of the sheet glass SG are controlled by controlling the ambient temperatures of the sheet glass SG), and thereby, the sheet glass SG is cooled so as to transition from the viscous range to the elastic range through the viscoelastic range.

It should be noted that a plurality of thermocouples (referred to here as a thermocouple unit 380 (see FIG. 5) are disposed near and in correspondence with the respective heaters 360a to 360e, as an ambient temperature detection means that detects the ambient temperature in each region of the sheet glass SG. That is, a plurality of thermocouples are disposed in the flow direction of the sheet glass SG and also in the width direction thereof.

The aforementioned step of cooling the sheet glass SG with the cooling rollers 330, the cooling units 340, and the heaters 360a to 360e in the region below the lower section 314 of the forming member 310 is the cooling step ST5.

(2-3) Cutting Device 400

The cutting device 400 performs the cutting step ST6. The cutting device 400 is a device for cutting the sheet glass SG, which flows downward in the forming device 300, from a direction perpendicular to the longitudinal surface of the sheet glass. Thus, the sheet glass SG, which has the shape of a sheet, is cut into a plurality of pieces of cut sheet glass SG1 each having a predetermined length. The cutting device 400 is driven by a cutting-device drive motor 392 (see FIG. 5).

(3) Control Device 500

Figure 5:
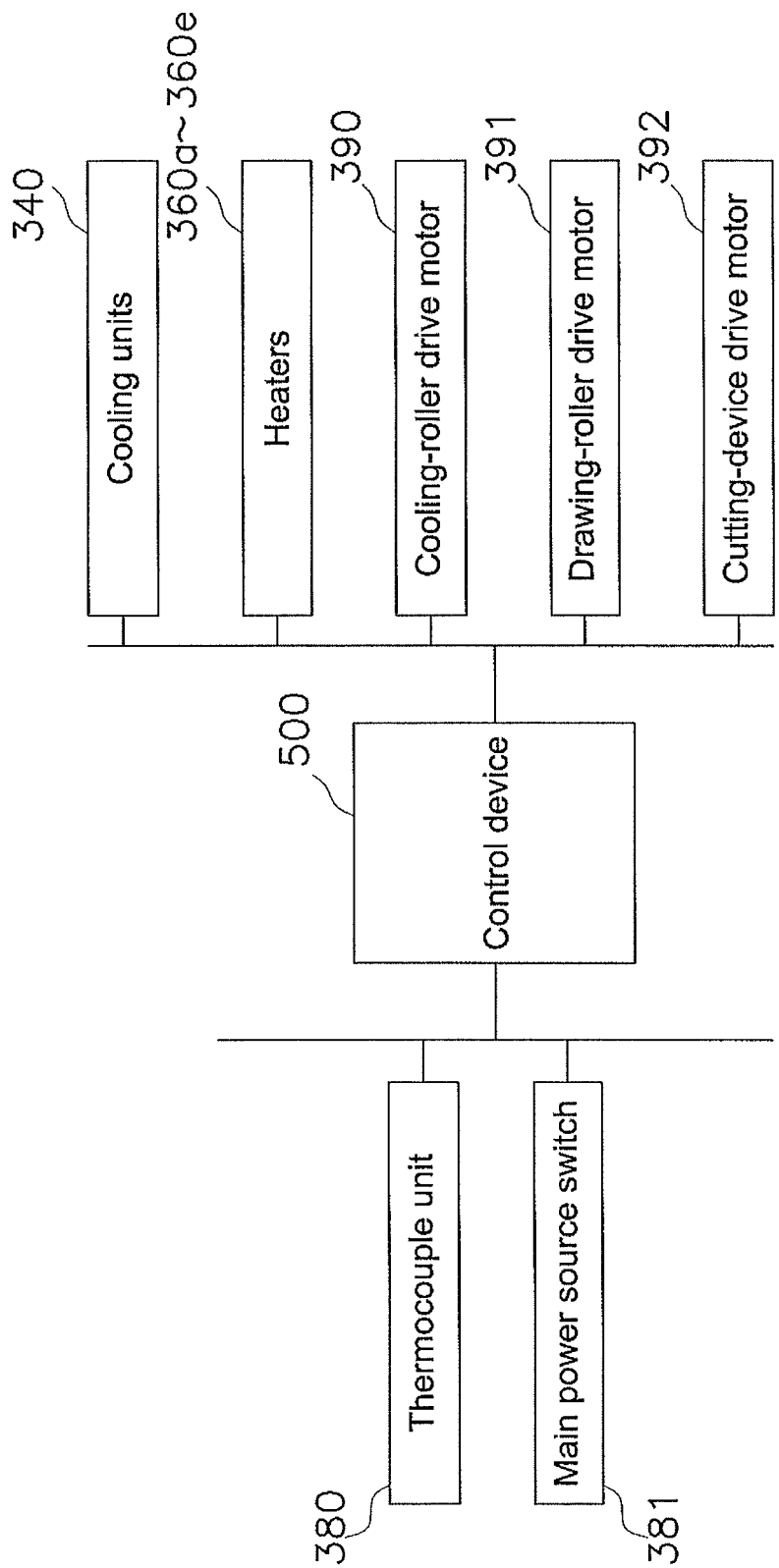
FIG. 5 is a control block diagram of a control device.

FIG. 5 is a control block diagram of a control device 500.

The control device 500 is made up of a CPU, a ROM, a RAM, a hard disk, and the like, and functions as a control section for controlling the various components included in the glass-plate manufacturing device 100.

More specifically, as illustrated in FIG. 5, the control device 500 controls the cooling units 340, the heaters 360a to 360e, the cooling-roller drive motor 390, the drawing-roller drive motor 391, the cutting-device drive motor 392, and the like in response to signals from various sensors (e.g., the thermocouple unit 380) and switches (e.g., a main power source switch 381) included in the glass-plate manufacturing device 100 and also signals input by an operator through an input device (not illustrated) or the like.

(4) Temperature Control in Cooling Step ST5

Figure 7:
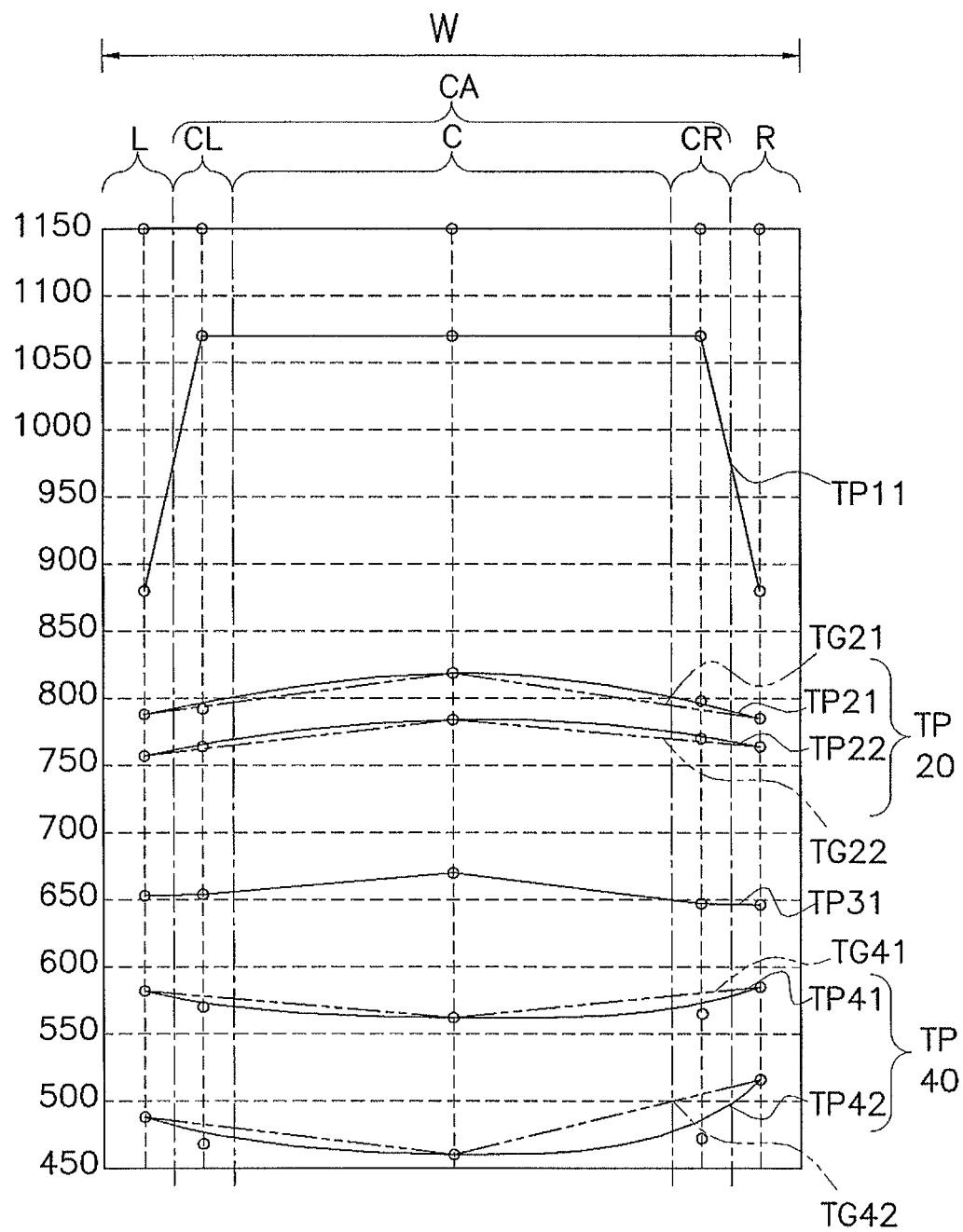
FIG. 7 is a graph illustrating the temperature profiles shown in the table of FIG. 6.

FIG. 6 is a table showing the temperatures of the sheet glass SG in various temperature profiles (described later). FIG. 7 is a graph illustrating the temperature profiles shown in the table of FIG. 6. FIG. 8 is a table showing cooling rates and temperature gradients in the temperature control steps ST11 to ST14.

In the cooling step ST5, a temperature control step ST10 of controlling the temperatures of the sheet glass SG is performed (see FIG. 8). More specifically, in the temperature control step ST10, the control device 500 controls the cooling rollers 330 and thereby controls temperature of the sheet glass SG. Also, in the temperature control step ST10, the control device 500 controls the ambient temperatures of the sheet glass SG by controlling the cooling units 340 and the heaters 360a to 360e, and thereby controls the temperatures of the sheet glass SG. It should be noted that the temperatures of the sheet glass SG shown in FIGS. 6 and 7 are values calculated through a simulation on the basis of the ambient temperatures of the sheet glass SG controlled by the cooling units 340 and the heaters 360a to 360e.

In the cooling step ST5, by performing the temperature control step ST10, the temperature of the sheet glass SG is controlled so that it falls within a predetermined temperature range at a predetermined height position, and also, the temperature of the sheet glass SG is controlled so that it has a predetermined temperature distribution in the width direction thereof. That is, the temperature of the sheet glass SG is controlled in the flow direction and the width direction thereof.

Hereinbelow, the temperature distributions that the temperatures of the sheet glass SG follow are referred to as temperature profiles (illustrated by solid lines in FIG. 7) as appropriate. It should be noted that, as illustrated in FIGS. 6 and 7, at the lower section 314 of the forming member 310, the temperature of the sheet glass SG is uniform (including the range of ±20° C.) along the width direction thereof, and is about 1150° C.

As illustrated in FIG. 8, the temperature control step ST10 includes an above-glass-strain-point temperature control step ST10a and a below-strain-point temperature control step ST14. Each temperature control step will be described below.

(4-1) Above-Glass-Strain-Point Temperature Control Step ST10a

The above-glass-strain-point temperature control step ST10a is a step of performing a temperature control of the sheet glass SG from the lower section 314 of the forming member 310 to where the temperature of the sheet glass SG falls below a temperature region near the glass strain point, and includes a first temperature control step ST11, a second temperature control step ST12, and a third temperature control step ST13. It should be noted that the "glass strain point" refers to the general strain point of glass, and is a temperature corresponding to a viscosity of $10^{14.5}$ poise (e.g., 661° C.). The "temperature region near the glass strain point" is a region ranging from a temperature found by dividing, by two, the sum of the glass strain point and the glass annealing point ((glass strain point+glass annealing point)/2) to a temperature found by subtracting 50° C. from the glass strain point (glass strain point −50° C.). The "glass annealing point" refers to the general annealing point of glass, and is a temperature corresponding to a viscosity of $10^{13}$ poise (e.g., 715° C.).

(4-1-1) First Temperature Control Step ST11

The first temperature control step ST11 is performed when the temperature of a location (central region CA) at which the sheet glass SG has the highest temperature in the width direction thereof is higher than or equal to the glass softening point. The "glass softening point" refers to the general softening point of glass, and is a temperature corresponding to a viscosity of $10^{7.6}$ poise (e.g., 950° C.).

In the first temperature control step ST11, control is performed such that the temperature profile follows a first temperature profile TP11.

(4-1-1-1) First Temperature Profile TP11

As illustrated in FIG. 7, the first temperature profile TP11 is a temperature profile in which the temperatures of the edges R, L of the sheet glass SG are made lower than the temperature of the central region CA, and in which the widthwise temperature of the central region CA, which is sandwiched between the edges R, L, is kept uniform. Herein, the expression "the widthwise temperature of the central region CA is kept uniform" means that the difference in temperature in the width direction within the central region CA falls within a range of from −20° C. to 20° C. It should be noted that the central region CA is a region made up of the right section CR, the central section C, and the left section CL. Specifically, the central region CA of the sheet glass SG is a region including sections subjected to thickness equalization, and the edges R, L, which are the widthwise (lateral) end sections of the sheet glass SG, are regions including sections subjected to cutting after manufacture.

(4-1-1-2) Control for Achieving First Temperature Profile TP11

In the first temperature control step ST11, the temperature profile is made to follow the first temperature profile TP11 by controlling the cooling rollers 330 and the cooling units 340. More specifically, the temperatures of the edges R, L of the sheet glass SG are made lower by a predetermined temperature (specifically, 200 to 250° C. lower) than the temperature of the central region CA by cooling the edges R, L of the sheet glass SG with the cooling rollers 330 and controlling the ambient temperatures of the sheet glass SG with the cooling units 340. Also, this temperature profile—in which the temperatures of the edges R, L are made lower by a predetermined temperature than the temperature of the central region CA and in which the widthwise temperature of the central region CA is kept uniform—is maintained by controlling the ambient temperatures of the sheet glass SG with the cooling units 340. In this way, the thickness of the central region CA of the sheet glass SG can be made as uniform as possible. As described above, there are three cooling units 340 disposed along the width direction. Thus, the temperatures of the edges R, L of the sheet glass SG and the temperature of the central region CA can be controlled independently.

It should be noted that, as illustrated in FIGS. 6 and 7, in the first temperature profile TP11, the temperature of the edges R, L of the sheet glass SG is 880° C., and the temperature of the central region CA is 1070° C.

(4-1-2) Second Temperature Control Step ST12

The second temperature control step ST12 is performed between a range from where the temperature of the central region CA of the sheet glass SG has fallen below the glass softening point to where the temperature of the sheet glass SG falls within the aforementioned temperature region near the glass strain point after passing a temperature region near the glass annealing point. Here, the "temperature region near the glass annealing point" refers to a region ranging from a temperature found by adding 100° C. to the glass annealing point (glass annealing point+100° C.) to above the temperature found by dividing, by two, the sum of the glass strain point and the glass annealing point ((glass strain point+glass annealing point)/2).

In the second temperature control step ST12, control is performed such that the temperature profile follows a second temperature profile TP20.

(4-1-2-1) Second Temperature Profile TP20

The second temperature profile TP20 is a temperature profile in which the temperature in the width direction of the sheet glass SG is decreased from the central section C toward the edges R, L, and has the shape of an upward-convex curved line. That is, in the second temperature control step ST12, the temperature in the central section C of the sheet glass SG is the highest, whereas the temperatures in the edges R, L of the sheet glass SG are the lowest, in regard to the width direction. It should be noted that, in the second temperature profile TP20, the temperature decreases continuously in the width direction from the central section C toward the edges R, L.

The second temperature profile TP20 includes a plurality of temperature profiles (specifically, a 2-a temperature profile TP21 and a 2-b temperature profile TP22 in the present embodiment). The 2-a temperature profile TP21 and the 2-b temperature profile TP22 are located in this order from the upstream side toward the downstream side in the flow direction of the sheet glass SG.

In the second temperature profile TP20, the absolute value of the temperature difference between the temperature of the edge R, L and the temperature of the central section C in the width direction of the sheet glass SG (referred to herein as "temperature-difference absolute value") becomes smaller toward the downstream side in the flow direction of the sheet glass SG (i.e., as the temperature of the sheet glass SG shifts toward the aforementioned temperature region near the glass strain point from the point where the temperature of the central region CA of the sheet glass SG has fallen below the glass softening point). Thus, the temperature-difference absolute value of the 2-a temperature profile TP21 is bigger than the temperature-difference absolute value of the 2-b temperature profile TP22.

Herein, the expression "the temperature-difference absolute value becomes smaller toward the downstream side in the flow direction of the sheet glass SG" can be stated differently to mean that, in the second temperature profile TP20, the temperature gradient between the temperature of each edge R, L of the sheet glass SG and the temperature of the central section C is decreased toward the downstream side in the flow direction of the sheet glass SG. The "temperature gradient between the temperature of each edge R, L of the sheet glass SG and the temperature of the central section C" is either the absolute value of a quotient found by dividing, by half the width W of the sheet glass SG, a value found by subtracting the temperature of the edge R from the temperature of the central section C (referred to herein as "first gradient absolute value"), or the absolute value of a quotient found by dividing, by half the width W of the sheet glass SG, a value found by subtracting the temperature of the edge L from the temperature of the central section C (referred to herein as "second gradient absolute value"), as illustrated by the long dashed double-short dashed lines in FIG. 7. It should be noted that, in the description below, the "temperature gradient between the temperature of each edge R, L of the sheet glass SG and the temperature of the central section C" refers to the average value of the first gradient absolute value and the second gradient absolute value.

In the second temperature control step ST12, the temperature gradient TG21 of the 2-a temperature profile TP21 is larger than the temperature gradient TG22 of the 2-b temperature profile TP22.

(4-1-2-2) Control for Achieving Second Temperature Profile TP20

In the second temperature control step ST12, the temperature profile is made to follow the second temperature profile TP20 by controlling some of the heaters (the heaters 360a and 360b in this embodiment).

More specifically, the 2-a temperature profile TP21 is formed by controlling the heaters 360a, and the 2-b temperature profile TP22 is formed by controlling the heaters 360b. It should be noted that, although not illustrated, the second temperature profile TP20 of the present embodiment also includes another temperature profile—a 2-c temperature profile. The 2-c temperature profile is a temperature profile that is formed immediately after the temperature of the central region CA of the sheet glass SG has fallen below the glass softening point. The 2-c temperature profile is formed by controlling the temperatures with the cooling units 340.

It should be noted that, in the present embodiment, the approximation curves of temperatures at five points—i.e., the edges R, L, the right section CR, the left section CL, and the central section C—constitute the second temperature profile TP20.

As illustrated in FIGS. 6 and 7, the temperatures of the edge L, the left section CL, the central section C, the right section CR, and the edge R of the sheet glass SG in the 2-a temperature profile TP21 are 785° C., 798° C., 819° C., 792° C., and 776° C. in this order. The temperatures of the edge L, the left section CL, the central section C, the right section CR, and the edge R of the sheet glass SG in the 2-b temperature profile TP22 are 763° C., 770° C., 784° C., 765° C., and 757° C. in this order.

Further, in the second temperature control step ST12, the heaters are controlled in a manner such that, in the width direction of the sheet glass SG, the cooling rate in the central section C becomes the fastest. That is, the heaters are controlled in a manner such that the cooling rate of the temperature in the central section C becomes faster than the cooling rates of the temperatures of the edges R, L and the temperatures of the right section CR and the left section CL in the width direction of the sheet glass SG. Thus, the 2-a temperature profile TP21 and the 2-b temperature profile TP22 can be formed. It should be noted that specific cooling rates will be described in the section on the near-strain-point temperature control step ST13. The temperature gradients TG21 and TG22 in the respective temperature profiles TP21 and TP22 are $7.4 \times 10^{-3}$° C./mm and $4.7 \times 10^{-3}$° C./mm.

(4-1-3) Third Temperature Control Step ST13

The third temperature control step ST13 is performed when the temperature of the sheet glass SG is within the aforementioned temperature region near the glass strain point.

In the third temperature control step ST13, control is performed such that the temperature profile follows a third temperature profile TP31.

(4-1-3-1) Third Temperature Profile TP31

The third temperature profile TP31 is a temperature profile in which the temperature in the width direction of the sheet glass SG (the temperature from the widthwise (lateral) edges R, L up to the central section C) becomes uniform. Stated differently, the third temperature profile TP31 is a temperature profile in which the temperature gradient between each edge R, L and the central section C in the width direction of the sheet glass SG is minimized.

Herein, the terms "become uniform" and "the temperature gradient is minimized" mean that the value found by subtracting the temperature of the edge R, L from the temperature of the central section C in the width direction of the sheet glass SG falls within a range of from −20° C. to 20° C.

(4-1-3-2) Control for Achieving Third Temperature Profile TP31

In the third temperature control step ST13, the temperature profile is made to follow the third temperature profile TP31 by controlling some of the heaters (the heaters 360c in this embodiment). Here, the heaters 360c are controlled in a manner such that the temperature-difference absolute value during the cooling step ST5 becomes the smallest.

It should be noted that, as illustrated in FIGS. 6 and 7, the temperatures of the edge L, the left section CL, the central section C, the right section CR, and the edge R of the sheet glass SG in the third temperature profile TP31 are 647° C., 647° C., 670° C., 654° C., and 653° C. in this order.

Further, in the third temperature control step ST13, the heaters 360c are controlled in a manner such that, in the width direction of the sheet glass SG, the cooling rate of the temperature in the central section C becomes the fastest, as in the second temperature control step ST12. That is, the heaters 360c are controlled in a manner such that the cooling rate of the temperature in the central section C becomes faster than the cooling rates of the temperatures of the edges R, L and the cooling rates of the temperatures of the right section CR and the left section CL of the sheet glass SG.

Specific cooling rates will be described in detail. For example, as illustrated in FIG. 8, the average cooling rate of the temperature in the central section C of the sheet glass SG in a temperature region ranging from 150° C. above the glass annealing point (glass annealing point+150° C.) to where the temperature falls below the aforementioned temperature region near the glass strain point is 2.7° C./second. Further, the average cooling rate of the temperature in each of the right section CR and the left section CL of the sheet glass SG in the temperature region ranging from 150° C. above the glass annealing point (glass annealing point+150° C.) to where the temperature falls below the aforementioned temperature region near the glass strain point is 2.5° C./second. Furthermore, the average cooling rate of the temperature in each of the edges R, L of the sheet glass SG in the temperature region ranging from 150° C. above the glass annealing point (glass annealing point+150° C.) to where the temperature falls below the aforementioned temperature region near the glass strain point is 2.1° C./second.

(4-2) Below-Strain-Point Temperature Control Step ST14

The below-strain-point temperature control step ST14 is performed when the temperature of the sheet glass SG is in a range from when it has fallen below the aforementioned temperature region near the glass strain point up to a temperature 200° C. below the glass strain point.

In the below-strain-point temperature control step ST14, control is performed such that the temperature profile follows a fourth temperature profile TP40.

(4-2-1) Fourth Temperature Profile TP40

The fourth temperature profile TP40 is a temperature profile in which the temperature in the width direction of the sheet glass SG is decreased from the edges R, L toward the central section C, and has the shape of a downward-convex curved line. That is, in the below-strain-point temperature control step ST14, the temperatures in the edges R, L of the sheet glass SG are the highest, whereas the temperature in the central section C of the sheet glass SG is the lowest, in regard to the width direction.

The fourth temperature profile TP40 includes a plurality of temperature profiles (specifically, a 4-a temperature profile TP41 and a 4-b temperature profile TP42 in the present embodiment). The 4-a temperature profile TP41 and the 4-b temperature profile TP42 are located in this order from the upstream side toward the downstream side in the flow direction of the sheet glass SG.

In the fourth temperature profile TP40, the temperature-difference absolute value becomes larger toward the downstream side in the flow direction of the sheet glass SG (i.e., as the temperature of the sheet glass SG shifts toward the temperature region 200° C. below the glass strain point from the point where the temperature has fallen below the aforementioned temperature region near the glass strain point). Thus, in the below-strain-point temperature control step ST14, the temperature-difference absolute value in the 4-a temperature profile TP41 is smaller than the temperature-difference absolute value in the 4-b temperature profile TP42.

Herein, the expression "the temperature-difference absolute value becomes larger toward the downstream side in the flow direction of the sheet glass SG" can be stated differently to mean that, in the fourth temperature profile TP40, the temperature gradient between the temperature of each edge R, L of the sheet glass SG and the temperature of the central section C is increased toward the downstream side in the flow direction of the sheet glass SG.

Thus, in the below-strain-point temperature control step ST14, the temperature gradient TG42 of the 4-b temperature profile TP42 is larger than the temperature gradient TG41 of the 4-a temperature profile TP41.

(4-2-2) Control for Achieving Fourth Temperature Profile TP40

In the below-strain-point temperature control step ST14, the temperature profile is made to follow the fourth temperature profile TP40 by controlling some of the heaters (the heaters 360d and 360e).

More specifically, the heaters 360d are controlled to achieve the 4-a temperature profile TP41, and the heaters 360e are controlled to achieve the 4-b temperature profile TP42.

It should be noted that, in the present embodiment, the approximation curves of temperatures at five points—i.e., the edges R, L, the right section CR, the left section CL, and the central section C—constitute the fourth temperature profile TP40.

As illustrated in FIGS. 6 and 7, the temperatures of the edge L, the left section CL, the central section C, the right section CR, and the edge R of the sheet glass SG in the 4-a temperature profile TP41 are 585° C., 565° C., 562° C., 570° C., and 582° C. in this order. The temperatures of the edge L, the left section CL, the central section C, the right section CR, and the edge R of the sheet glass SG in the 4-b temperature profile TP42 are 506° C., 472° C., 463° C., 468° C., and 488° C. in this order.

Further, as illustrated in FIG. 8, in the below-strain-point temperature control step ST14, the heaters are controlled in a manner such that, in the width direction of the sheet glass SG, the cooling rate of the temperature in the central section C becomes the fastest. That is, the heaters are controlled in a manner such that the cooling rate of the temperature in the central section C becomes faster than the cooling rates of the temperatures of the edges R, L and the cooling rates of the temperatures of the right section CR and the left section CL of the sheet glass SG.

Here, the average cooling rate of the temperature in the central section C of the sheet glass SG in the below-strain-point temperature control step ST14 is 3.0° C./second. Further, the average cooling rate of the temperature in each of the right section CR and the left section CL of the sheet glass SG in the below-strain-point temperature control step ST14 is 2.7° C./second. Furthermore, the average cooling rate of the temperature in each of the edges R, L of the sheet glass SG in the below-strain-point temperature control step ST14 is 2.0° C./second. Further, the temperature gradients TG41 and TG42 in the respective temperature profiles TP41 and TP42 are $4.1 \times 10^{-3}$° C./mm and $6.7 \times 10^{-3}$° C./mm.

It should be noted that, in the second temperature control step ST12, the third temperature control step ST13, and the below-strain-point temperature control step ST14, the temperature profiles in the respective steps are achieved by controlling the output of the heaters 360a to 360e on the basis of the ambient temperatures detected by the thermocouple unit 380.

(5) Warpage of Glass Plate

Glass plates were manufactured by employing the aforementioned glass-plate manufacturing method, and the warpage of the glass plate was measured. The warpage value was 0.15 mm or less.

The warpage of the glass plate is measured as follows. First, eight pieces of small plates are cut out from the valid region of the glass plate. Next, each small plate is placed on a surface plate for a glass. Then, the gap between the small plate and the glass surface plate is measured at a plurality of points (in the present embodiment, at the four corners, at two points in the central section along the long side, and at two points in the central section along the short side) with a feeler gauge.

(6) Strain of Glass Plate

The magnitude of the birefringence rate of the glass plate was measured by using a birefringence measurement device ABR-10A (product of Uniopt Corporation, Ltd.). The maximum birefringence amount was 0.6 nm.

(7) Thickness Deviation of Glass Plate

The thickness deviation was measured at intervals of 5 mm along the width direction in the valid region of the glass plate by using a displacement gauge (product of Keyence Corporation). The thickness deviations of the glass plate were 10 to 15 μm.

(8) Characteristic Features (8-1)

In the present embodiment, the above-glass-strain-point temperature control step ST10a is performed in the cooling step ST5. The above-glass-strain-point temperature control step ST10a includes a first temperature control step ST11, a second temperature control step ST12, and a third temperature control step ST13.

Generally, a sheet glass that has separated from the forming member tends to contract due to its own surface tension. Thus, there are concerns that the thickness of the sheet glass may become uneven.

So, in the present embodiment, in the first temperature control step ST11 in a temperature region where the temperature of the central section C of the sheet glass SG is equal to or higher than the glass softening point, the edges R, L of the sheet glass SG are cooled rapidly while drawing downward the sheet glass SG with the cooling rollers 330 disposed immediately below the forming member 310. In this way, the viscosity of the edges R, L of the sheet glass SG can be increased as quickly as possible (specifically, the viscosity can be increased to $10^{9.0}$ poise or greater), and the contraction of the sheet glass SG due to surface tension can be inhibited. If the sheet glass SG contracts in the width direction, then the contracted sections become thick, and thickness deviation becomes poor. So, by making the temperature of the edges R, L of the sheet glass SG lower than the temperature of the central region CA in the first temperature control step ST11, the thickness of the sheet glass SG—and therefore the thickness of the glass plates—can be made uniform along the width direction.

Further, in the first temperature control step ST11, by keeping the temperature of the central region CA of the sheet glass SG uniform, the viscosity of the central region CA becomes uniform. Thus, the thickness of the sheet glass SG can be made uniform.

Further, in the present embodiment, the peripheral speed of the cooling rollers 330 is slower than the peripheral speed of the drawing rollers 350a to 350e.

In this way, the period of time that the edges R, L of the sheet glass SG contact the cooling rollers 330 can be made longer, thus further improving the cooling effect on the edges R, L of the sheet glass SG achieved by the cooling rollers 330. Thus, the thickness of the sheet glass SG—and therefore the thickness of the glass plates—can be made even more uniform in the width direction.

It is considered that, generally, a strain (residual stress) is likely to occur in cases where there is a temperature difference in the width direction of the sheet glass in the temperature region near the glass strain point.

So, in the present embodiment, by performing the third temperature control step ST13, the ambient temperatures are controlled in a manner such that the temperature gradient between the edges R, L and the central section C in the width direction of the sheet glass SG is minimized in the temperature region near the glass strain point. That is, the temperature-difference absolute value during the cooling step ST5 is made the smallest in the third temperature control step ST13. If the sheet glass SG has a difference in temperature at the glass strain point, then a strain will occur after the sheet glass is cooled to room temperature. So, by reducing the temperature gradient between the edges R, L and the central section C in the width direction of the sheet glass SG toward the temperature region near the glass strain point in the third temperature control step ST13, strains in the sheet glass SG can be reduced. As regards the temperature gradient, it is preferable that the value found by subtracting the temperature of the edge R, L from the temperature of the central section C of the sheet glass SG falls within a range of from −20° C. to 20° C.

In this way, strains (residual stresses) in the sheet glass SG—and therefore strains (residual stresses) in the glass plates—can be reduced.

Further, in the present embodiment, the temperature profile shifts from the second temperature profile TP20—in which the temperature in the width direction of the sheet glass SG is decreased from the central section C toward the edges R, L—to the third temperature profile TP31—in which the temperature in the width direction of the sheet glass SG is made uniform. That is, according to the present embodiment, in the second temperature control step ST12 and the third temperature control step ST13 in a temperature region where the temperature of the central section C of the sheet glass SG is lower than the glass softening point, the cooling rate of the temperature in the central section C is made faster than the cooling rates of the temperatures in the edges R, L, in regard to the width direction of the sheet glass SG.

Thus, in the second temperature control step ST12 and the third temperature control step ST13, the amount of volumetric shrinkage of the sheet glass SG increases from the edges R, L of the sheet glass SG toward the central section C, and thus, a tensile stress acts on the central section C of the sheet glass SG. Particularly, a tensile stress acts on the central section C of the sheet glass SG in both the flow direction and the width direction of the sheet glass SG. It should be noted that, preferably, the tensile stress acting in the flow direction of the sheet glass SG is larger than the tensile stress acting in the width direction of the sheet glass SG. With this tensile stress, the sheet glass can be cooled while maintaining the flatness of the sheet glass SG, and thus, warpage of the sheet glass SG—and thus warpage of the glass plates—can be further reduced.

It should be noted that, in the present embodiment, the temperature of the edges R, L is cooled and the temperature difference between the edges R, L and the central region CA is kept at a predetermined temperature by the first temperature control step ST11. This is why the cooling rate of the temperature in the central section C can be made faster than the cooling rates of the temperatures in the edges R, L in the second temperature control step ST12 and the third temperature control step ST13.

(8-2)

In the present embodiment, a tensile stress is always applied to the central section C of the sheet glass SG even in the below-strain-point temperature control step ST14. Further, a tensile stress is applied to the central section C of the sheet glass SG also in the first temperature control step ST11 by quickly increasing the viscosity of the edges R, L to a predetermined value or greater by the cooling rollers 330.

Thus, in the cooling step ST5 of the present embodiment, not only is a tensile stress applied to the sheet glass SG in the width direction and the flow direction thereof by the cooling rollers 330 and the drawing rollers 350a to 350e, but also, a tensile stress is applied to the sheet glass SG (and particularly the central section C) in the width direction and the flow direction thereof also by performing temperature control. Thus, warpage of the sheet glass SG—and therefore warpage of the glass plates—can be reduced.

(8-3)

In the present embodiment, a below-strain-point temperature control step ST14 is performed, in which, in a temperature region below the aforementioned temperature region near the glass strain point, the temperature in the width direction of the sheet glass SG is decreased from the edges R, L toward the central section C. In this way, the amount of volumetric shrinkage of the sheet glass SG increases from the edges R, L of the sheet glass SG toward the central section C, and thus, a tensile stress acts on the central section C of the sheet glass SG in both the flow direction and the width direction of the sheet glass SG. With this tensile stress, the sheet glass can be cooled while maintaining the flatness of the sheet glass SG, and thus, warpage of the sheet glass SG can be reduced.

(9) Modified Examples

The present embodiment has been described above with reference to the drawings. The specific configurations, however, are not limited to the foregoing embodiment, and various modifications can be made without departing from the gist of the invention.

(9-1) Modified Example 1A

In the foregoing embodiment, three cooling units 340 were arranged in the width direction of the sheet glass SG in order to control the ambient temperatures in the edges R, L and the central region CA of the sheet glass SG. However, the number is not limited thereto, and there may be more than three cooling units.

Further, in the foregoing embodiment, five heaters were arranged in the width direction of the sheet glass SG. However, the number of heaters to be arranged in the width direction of the sheet glass SG is not limited thereto.

For example, the number of heaters in the width direction of the sheet glass SG may be more than five. In this case, it is preferable to increase the number of thermocouples in correspondence with the heaters.

In this way, the temperatures or the ambient temperatures of the sheet glass SG can be controlled more finely to achieve a more ideal temperature profile shape. This can contribute to a further reduction in warpage and strain of the sheet glass SG and therefore the glass plates.

(9-2) Modified Example 1B

In the foregoing embodiment, five heaters were arranged in the flow direction of the sheet glass SG. However, the number of heaters to be arranged in the flow direction of the sheet glass SG is not limited thereto.

For example, the number of heaters in the flow direction of the sheet glass SG may be more than five.

In this way, the temperatures or the ambient temperatures in the flow direction of the sheet glass SG can be controlled more finely. This can contribute to a further reduction in warpage and strain of the sheet glass SG and therefore can contribute to a further reduction in warpage and strain of the glass plates.

(9-3) Modified Example 1C

The forming device 300 may have a plurality of heat insulating components arranged between the plurality of drawing rollers 350a to 350e. The heat insulating components will be disposed on both sides in the thickness direction of the sheet glass SG.

Providing such heat insulating components will further facilitate the control of the temperatures and the ambient temperatures of the sheet glass SG. That is, it is possible to inhibit the occurrence of strains in the sheet glass SG and therefore it is possible to inhibit the occurrence of strains in the glass plates.

(9-4) Modified Example 1D

It was described above that, in the third temperature control step ST13, temperature control is performed in a manner such that the temperature in the width direction of the sheet glass SG is always kept uniform when the temperature of the sheet glass SG is within the temperature region near the glass strain point.

This, however, is not a limitation, and it will suffice if the temperature in the width direction of the sheet glass SG becomes uniform at least once when the temperature of the sheet glass SG is within the temperature region near the glass strain point. That is, it will suffice if the third temperature profile TP31 is established at least once.

So, for example, in cases where there are more heaters than in the foregoing embodiment along the flow direction of the sheet glass SG at height positions where the temperature of the sheet glass SG falls within the temperature region near the glass strain point, then it will suffice if the temperature is controlled such that the third temperature profile TP31 is established at least once in the third temperature control step ST13, and the other temperature profiles therein do not have to be temperature-controlled such that they have a uniform temperature in the width direction. In this case, the temperature profiles located above the third temperature profile TP31 will look like the second temperature profile TP20, and the temperature profiles located below the third temperature profile TP31 will look like the fourth temperature profile TP40.

Even in this case, the temperature-difference absolute value (or the temperature gradient) can be made the smallest in the temperature region near the strain point. Thus, strains in the sheet glass SG—and therefore strains in the glass plates—can be reduced.

(9-5) Modified Example 1E

In the foregoing embodiment, it was described that the temperature control in the width direction of the sheet glass SG was performed by a plurality of heaters arranged in the width direction of the sheet glass SG. This, however, is not a limitation, and, for example, a cooling device may be used in combination.

(9-6) Modified Example 1F

In the foregoing embodiment, the temperature gradient in the second temperature control step ST12 was formed in a manner such that the temperature in the width direction of the sheet glass SG is decreased from the central section toward the end sections. However, it is more preferable that, in the second temperature control step ST12, the widthwise temperature gradient of the sheet glass SG gradually decreases along the flow direction of the sheet glass SG.

Moreover, it is more preferable that, in the second temperature control step ST12, the temperature gradient is formed in a manner such that the temperature in the width direction of the sheet glass SG gradually decreases from the central section toward the end sections. In this case, it is even more preferable that the temperature gradient gradually decreases along the flow direction of the sheet glass SG.

Moreover, it is more preferable that, in the second temperature control step ST12, the temperature gradient is formed in a manner such that the temperature in the width direction of the sheet glass SG gradually decreases according to a convex profile from the central section toward the end sections. In this case, it is even more preferable that the temperature gradient gradually decreases along the flow direction of the sheet glass SG.

(9-7) Modified Example 1G

In the below-strain-point temperature control step ST14 of the foregoing embodiment, the temperature gradient was formed in a manner such that, in the temperature region below the aforementioned temperature region near the glass strain point, the temperature in the width direction of the sheet glass SG is decreased from the edges R, L toward the central section C. However, it is more preferable that, in the below-strain-point temperature control step ST14, the temperature gradient is formed in a manner such that the temperature of the sheet glass SG gradually decreases from the edges R, L toward the central section C in the temperature region below the aforementioned temperature region near the glass strain point.

Furthermore, it is more preferable that, in the below-strain-point temperature control step ST14, the temperature gradient is formed in a manner such that the temperature of the sheet glass SG gradually decreases according to a convex profile from the edges R, L toward the central section C in the temperature region below the aforementioned temperature region near the glass strain point.

Moreover, it is more preferable that, in the below-strain-point temperature control step ST14, the temperature gradient between each edge R, L and the central section C of the sheet glass SG is increased, or gradually increased, along the flow direction of the sheet glass SG.

INDUSTRIAL APPLICABILITY

The present invention is applicable to various glass-plate manufacturing methods for manufacturing glass plates by employing down-draw process.

REFERENCE SIGNS LIST

100: Glass-plate manufacturing device
310: Forming member
314: Lower section of forming member
330: Cooling rollers (rollers)
350a to 350e: Drawing rollers (rollers)
C: Central section of sheet glass
R, L: Edges (widthwise (lateral) end sections) of sheet glass
SG: Sheet glass
ST4: Forming step
ST5: Cooling step
ST10a: Above-glass-strain-point temperature control step
ST11: First temperature control step
ST12: Second temperature control step
ST13: Third temperature control step

CITATION LIST

Patent Literature

Patent Literature 1: Japanese Patent Application Laid-Open Publication JP-A-2004-115357

The invention claimed is:
1. A method for manufacturing a glass plate by a down-draw process, the method comprising
a forming step of forming a sheet glass by making a molten glass flow downward along opposite side surfaces of a forming member and merge at a lower section of the forming member, and
a cooling step of cooling the sheet glass while drawing the sheet glass downward with rollers,
wherein, in the cooling step, an above-glass-strain-point temperature control step is performed, the above-glass-strain-point temperature control step being a step of performing a temperature control in the width direction of the sheet glass in a temperature region ranging from the lower section of the forming member to where the temperature of the sheet glass falls below a temperature region near the strain point of glass, the above-glass-strain-point temperature control step including: a first temperature control step in which end sections in the width direction of the sheet glass each have a lower temperature than a central region that is sandwiched between the end sections, and in which the temperature of the central region is kept uniform; a second temperature control step in which the temperature in the width direction of the sheet glass is decreased from a central section of the sheet glass toward the end sections thereof; and a third temperature control step in which a temperature gradient between each said end section and said central section in the width direction of the sheet glass is minimized in said temperature region near the glass strain point,
wherein the first temperature control step is performed when the temperature of the central section of the sheet glass is higher than or equal to the softening point of glass and the temperature of the end sections of the sheet glass is below the glass softening point; and the second temperature control step and the third temperature control step are performed when the temperature of the central section of the sheet glass is below the glass softening point.

2. The glass-plate manufacturing method according to claim 1, wherein the difference in temperature between each said end section and the central section in the width direction of the sheet glass during the cooling step is made the smallest in the third temperature control step.

3. The glass-plate manufacturing method according to claim 2, wherein minimizing said temperature gradient means that a value found by subtracting the temperature of the end section from the temperature of the central section in the width direction of the sheet glass falls within a range of from −20° C. to 20° C.

4. The glass-plate manufacturing method according to claim 3, wherein the above-glass-strain-point temperature control step further includes a fourth temperature control step in which, in a temperature region below said temperature region near the glass strain point, the temperature in the width direction of the sheet glass is decreased from the end sections toward the central section.

5. The glass-plate manufacturing method according to claim 2, wherein the above-glass-strain-point temperature control step further includes a fourth temperature control step in which, in a temperature region below said temperature region near the glass strain point, the temperature in the width direction of the sheet glass is decreased from the end sections toward the central section.

6. The glass-plate manufacturing method according to claim 5, wherein, in the fourth temperature control step, the temperature gradient between each said end section and said central section in the width direction of the sheet glass is increased along the flow direction of the sheet glass.

7. The glass-plate manufacturing method according to claim 1, wherein minimizing said temperature gradient means that a value found by subtracting the temperature of the end section from the temperature of the central section in the width direction of the sheet glass falls within a range of from −20° C. to 20° C.

8. The glass-plate manufacturing method according to claim 7, wherein the above-glass-strain-point temperature control step further includes a fourth temperature control step in which, in a temperature region below said temperature region near the glass strain point, the temperature in the width direction of the sheet glass is decreased from the end sections toward the central section.

9. The glass-plate manufacturing method according to claim 8, wherein, in the fourth temperature control step, the temperature gradient between each said end section and said central section in the width direction of the sheet glass is increased along the flow direction of the sheet glass.

10. The glass-plate manufacturing method according to claim 1, wherein, in the cooling step, a fourth temperature control step is further performed, the fourth temperature control step in which, in a temperature region below said temperature region near the glass strain point, the temperature in the width direction of the sheet glass is decreased from the end sections toward the central section.

11. The glass-plate manufacturing method according to claim 10, wherein, in the fourth temperature control step, the temperature gradient between each said end section and said central section in the width direction of the sheet glass is increased along the flow direction of the sheet glass.

* * * * *